(12) United States Patent
Agnihotram et al.

(10) Patent No.: US 12,406,479 B2
(45) Date of Patent: Sep. 2, 2025

(54) METHOD AND SYSTEM FOR DYNAMICALLY GENERATING ANNOTATED CONTENT FOR AR-VR APPLICATIONS

(71) Applicant: Wipro Limited, Bangalore (IN)

(72) Inventors: Gopichand Agnihotram, Bangalore (IN); Shrivardhan Satish Suryawanshi, Sangli (IN)

(73) Assignee: Wipro Limited, Bangalore (IN)

( * ) Notice: Subject to any disclaimer, the term of this patent is extended or adjusted under 35 U.S.C. 154(b) by 571 days.

(21) Appl. No.: 17/657,436

(22) Filed: Mar. 31, 2022

(65) Prior Publication Data

US 2023/0252768 A1 Aug. 10, 2023

(30) Foreign Application Priority Data

Feb. 10, 2022 (IN) .............................. 202241007054

(51) Int. Cl.
*G06V 10/774* (2022.01)
*G06V 10/25* (2022.01)
(Continued)

(52) U.S. Cl.
CPC .......... *G06V 10/7747* (2022.01); *G06V 10/25* (2022.01); *G06V 10/40* (2022.01); *G06V 10/761* (2022.01)

(58) Field of Classification Search
CPC .... G06V 10/7747; G06V 10/25; G06V 10/40; G06V 10/761; G06V 10/462; G06V 10/82; G06V 10/774; G06V 20/20
See application file for complete search history.

(56) References Cited

U.S. PATENT DOCUMENTS

2012/0316421 A1* 12/2012 Kumar ............. A61B 1/000096
600/407
2016/0358382 A1* 12/2016 Lee ....................... H04N 13/363
(Continued)

FOREIGN PATENT DOCUMENTS

DE 102019102866 A1 8/2019

OTHER PUBLICATIONS

Raso, R., et al., "Automated Augmented Reality Content Creation for Print Media", Institute for Information Systems (IWi) at the German Research Center for Artificial Intelligence (DFKI), 2017, 15 pages.

*Primary Examiner* — Amandeep Saini
*Assistant Examiner* — Mehrazul Islam
(74) *Attorney, Agent, or Firm* — Finnegan, Henderson, Farabow, Garrett & Dunner, LLP.

(57) ABSTRACT

A method and content annotating system for dynamically generating annotated content for training model for AR-VR applications. The content annotating system receives plurality of images for object associated with AR-VR applications. The content annotating system obtains pre-annotated datasets related to the plurality of images from user. The content annotating system generates plurality of augmented image datasets and extracts set of features from the pre-annotated datasets and the plurality of augmented image datasets. The content annotating systems compares the sets of features to identify ROIs on the plurality of augmented image datasets. Further, the content annotating system generates annotated content for the plurality of augmented image datasets based on comparison. The annotated content and the pre-annotated datasets are used to train model associated with AR-VR applications. Thus, the present disclosure dynamically generates annotated content to train model and detect objects associated with AR-VR applications.

14 Claims, 5 Drawing Sheets

(51) Int. Cl.
  *G06V 10/40*        (2022.01)
  *G06V 10/74*        (2022.01)

(56) References Cited

U.S. PATENT DOCUMENTS

| | | | |
|---|---|---|---|
| 2019/0244348 A1* | 8/2019 | Buckler | G06V 10/25 |
| 2019/0347501 A1* | 11/2019 | Kim | G06F 18/2163 |
| 2020/0380312 A1* | 12/2020 | Khan | G06F 18/2185 |
| 2022/0165034 A1* | 5/2022 | Zhou | G06V 20/64 |

* cited by examiner

METHOD AND SYSTEM FOR DYNAMICALLY GENERATING ANNOTATED CONTENT FOR AR-VR APPLICATIONS

TECHNICAL FIELD

The present subject matter is related in general to object detection and Augmented Reality (AR) and Virtual Reality (VR) applications, more particularly, but not exclusively, the present subject matter relates to a method and system for dynamically generating annotated content for training a model for AR-VR applications.

BACKGROUND

Augmented Reality-Virtual Reality (AR-VR) is widely used for developing assisted systems for helping users in various industries. AR-VR digital tools either superimpose images on the real world (AR) or bring the users into an artificial digital experience (VR). AR-VR devices are programmed with a set of instructions for guiding the users to perform an intended task such as, repair of devices, maintenance of devices and so on. In most cases, the users may not have prior knowledge on repair or maintenance task that needs to be performed on a device such as a machine or machine parts.

Currently, existing AR-VR applications can be used to guide the users to complete the intended task. In the existing AR-VR applications, step-by-step guidance is provided to the users on how to repair the device or how to perform maintenance activity on the device. In this case, the detection of the device and the device parts plays a key role in generating the repair and maintenance steps for the user. Further, to detect the device and the device parts the existing AR-VR applications generate object detection model by manually annotating images of the device and the device parts. In another existing AR-VR applications, template based automated annotation is used to annotate substantially similar images for detecting the device. However, the existing AR-VR applications are unable to dynamically generate annotation for different images of the same device with varying distortion, scale, and rotations to train the object detection model in the AR-VR applications.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method of dynamically generating annotated content for training a model for Augmented and Virtual Reality (AR-VR) applications. The method comprises receiving a plurality of images for an object associated with AR-VR applications. Upon receiving the plurality of images, the method comprises obtaining one or more pre-annotated datasets related to one or more images of the plurality of images from a user. Upon obtaining the one or more pre-annotated datasets, the method comprises generating a plurality of augmented image datasets for the plurality of images using a predefined set of augmented parameters. Upon generating the plurality of augmented image datasets, the method comprises extracting a set of features from the one or more pre-annotated datasets and the plurality of augmented image datasets. The extracted set of features of the one or more pre-annotated datasets is compared with the set of features of the plurality of augmented image datasets. Thereafter, the method comprises generating annotated content for the plurality of augmented image datasets based on the comparison. The annotated content for the plurality of augmented image datasets along with the one or more pre-annotated datasets are used for training the model associated with the AR-VR applications.

In an embodiment, the present disclosure relates to a content annotating system for dynamically generating annotated content for training a model for Augmented and Virtual Reality (AR-VR) applications. The content annotating system includes a processor and a memory communicatively coupled to the processor. The memory stores processor-executable instructions, which on execution cause the processor to dynamically generate annotated content for training a model for Augmented and Virtual Reality (AR-VR) applications. The content annotating system receives a plurality of images for an object associated with AR-VR applications. Upon receiving the plurality of images, the content annotating system obtains one or more pre-annotated datasets related to one or more images of the plurality of images from a user. Upon obtaining the one or more pre-annotated datasets, the content annotating system generates a plurality of augmented image datasets for the plurality of images using a predefined set of augmented parameters. Upon generating the plurality of augmented image datasets, the content annotating system extracts a set of features from the one or more pre-annotated datasets and the plurality of augmented image datasets. The extracted set of features of the one or more pre-annotated datasets is compared with the set of features of the plurality of augmented image datasets. Thereafter, the content annotating system generates annotated content for the plurality of augmented image datasets based on the comparison. The annotated content for the plurality of augmented image datasets along with the one or more pre-annotated datasets are used for training the model associated with the AR-VR applications.

In an embodiment, the present disclosure relates to a non-transitory computer readable medium including instructions stored thereon that when processed by at least one processor may cause a content annotating system to receive a plurality of images for an object associated with AR-VR applications. Upon receiving the plurality of images, the instruction causes the processor to obtain one or more pre-annotated datasets related to one or more images of the plurality of images from a user. Upon obtaining the one or more pre-annotated datasets, the instruction causes the processor to generate a plurality of augmented image datasets for the plurality of images using a predefined set of augmented parameters. Upon generating the plurality of augmented image datasets, the instruction causes the processor to extract a set of features from the one or more pre-annotated datasets and the plurality of augmented image datasets. The extracted set of features of the one or more pre-annotated datasets is compared with the set of features of the plurality of augmented image datasets. Thereafter, the instruction causes the processor to generate annotated content for the plurality of augmented image datasets based on the comparison. The annotated content for the plurality of augmented image datasets along with the one or more pre-annotated datasets are used for training the model associated with the AR-VR applications.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
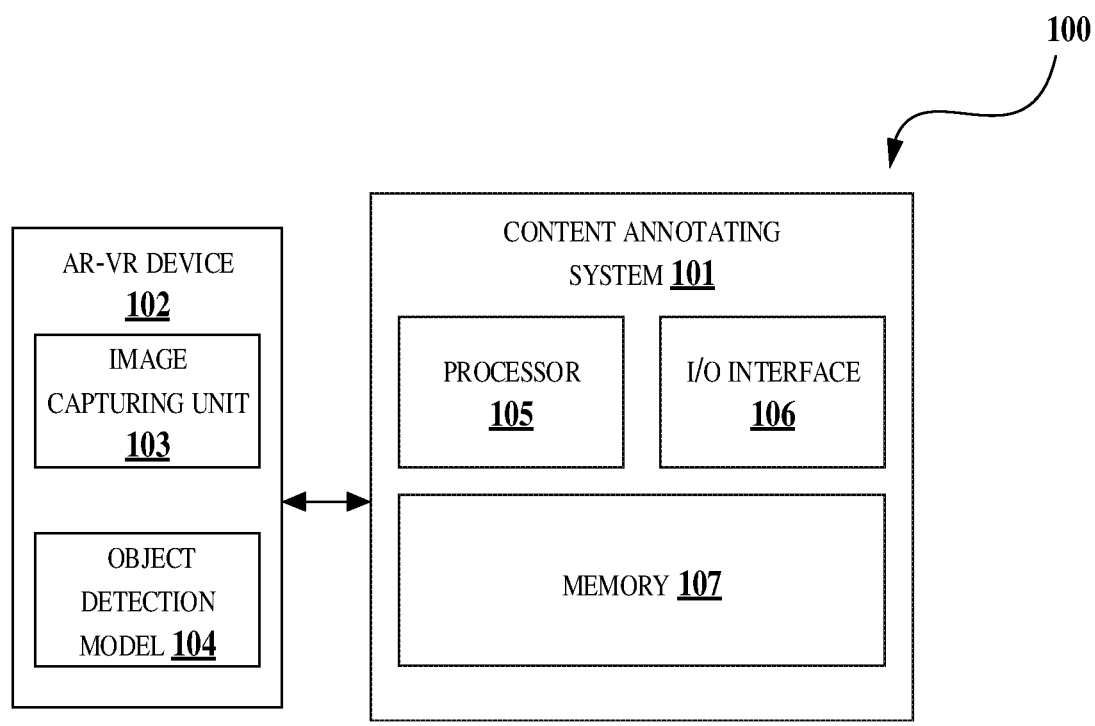
FIG. 1 shows an exemplary environment for dynamically generating annotated content for training a model for AR-VR applications, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Present disclosure relates to a method and content annotating system for dynamically generating annotated content for training a model for AR-VR applications. The present disclosure utilizes plurality of images of an object for dynamically generating annotated content for training the model for the AR-VR applications. The plurality of images of the object is utilized to identify Region of Interests (ROIs) along with labels associated with the ROIs to detect the object associated with AR-VR application to provide instructions for repair/maintenance to a user. Upon identifying absences of the ROIs on the plurality of images, the content annotating system generates annotated content for the plurality of images by generating plurality of augmented image datasets and obtaining one or more pre-annotated datasets from the user. The content annotating system utilizes the generated annotated content and the one or more pre-annotated datasets to train the model. Thus, the present disclosure reduces time required for annotating ROIs of the object as the content annotating system dynamically generates annotated content for training the model to detect the object associated with the AR-VR applications.

FIG. 1 shows an exemplary environment 100 for dynamically generating annotated content for training a model for AR-VR applications. The exemplary environment 100 includes a content annotating system 101 and an AR-VR device 102. In an embodiment, a user may interact with the content annotating system 101 via the AR-VR device 102. In an embodiment, the AR-VR device 102 is used to obtain interactive experience of a real-world environment by enhancing objects which reside in the real-world. The AR-VR device 102 may include, but not limited to, optical projection systems, monitors, display system, head-mounted display, VR headsets, a laptop computer, a desktop computer, a Personal Computer (PC), a notebook, a smartphone, a tablet, and the like. The AR-VR device 102 comprises an image capturing unit 103 and an object detection model 104

(hereafter referred as the model 104) for detecting the object in the real-world. The AR-VR device 102 may include any other units or components, not shown explicitly in FIG. 1. The image capturing unit 103 may be a camera, a video recorder or any image sensor which captures images or videos of the object. The model 104 may be a neural network model trained using machine learning techniques to detect the object associated with the AR-VR applications.

Further, the content annotating system 101 may include a processor 105, a I/O interface 106, and a memory 107. In some embodiments, the memory 107 may be communicatively coupled to the processor 105. The memory 107 stores instructions, executable by the processor 105, which, on execution, may cause the content annotating system 101 to dynamically generate annotated content for training the model 104 associated with the AR-VR device 102, as disclosed in the present disclosure.

The content annotating system 101 may communicate with the AR-VR device 102 via a communication network (not show explicitly in FIG. 1). In an embodiment, the communication network may include, without limitation, a direct interconnection, Local Area Network (LAN), Wide Area Network (WAN), Controller Area Network (CAN), wireless network (e.g., using a Wireless Application Protocol), the Internet, and the like.

The content annotating system 101 may receive a plurality of images for an object associated with AR-VR applications. In an embodiment, the object may be a device or a device part which requires repair or maintenance from a user. The user detects the object and obtains repair/maintenance instruction for the object using the AR-VR applications. The content annotating system 101 may communicate with the AR-VR device 102 for receiving the plurality of images. The plurality of images may be directly captured using the image capturing unit 103 or obtained by segmenting videos of the object. The plurality of images or frames of the video of the object may be received by the content annotating system 101. One or more other modes, known to a person skilled in the art, may be used by the content annotating system 101, to receive the images or videos of the object.

Upon receiving the plurality of images from the image capturing unit 103 of the AR-R device 102, the content annotating system 101 may identify either presence or absence of one or more ROIs along with associated one or more labels on one or more similar images with respect to the plurality of images using the model 104. Upon identifying the absence of the one or more ROIs on the one or more similar images, the content annotating system 101 may obtain one or more pre-annotated datasets related to one or more images of the plurality of images from a user. For example, one or more images at different angles covering different parts of the object are taken from the plurality of images and manually annotated by the user. The user may select one or more Region of Interest (ROI) manually on the one or more images and annotate the one or more images. Upon obtaining the pre-annotated datasets, the content annotating system 101 may generate a plurality of augmented image datasets for the plurality of images using a predefined set of augmented parameters. The predefined set of augmented parameters comprise at least one of, one or more size rotation of the plurality of images, zoom images of the plurality of images, flip or rotated images of the plurality of images and distortion associated with each of the plurality of images. Upon generating the plurality of augmented image datasets, the content annotating system 101 extracts a set of features from the one or more pre-annotated datasets and the plurality of augmented image datasets. To extract the set of features, the content annotating system 101 may initially select one or more ROIs from each of the one or more pre-annotated datasets. Upon selecting the one or more ROIs, the content annotating system 101 extracts the set of features from the one or more ROIs associated with each of the one or more pr-annotated datasets and the set of features for the plurality of augmented image datasets. In an embodiment, the set of features are in vector form and include, but not limited, textual features, colour features, edge features and the like. The extracted set of features of the one or more pre-annotated datasets is compared with the set of features of the plurality of augmented image datasets.

Further, the content annotating system 101 may compute a similarity value between the set of features of the one or more pre-annotated datasets and the set of features of the plurality of augmented image datasets. In an embodiment, the similarity value is a cosine similarity which is a measure of similarity between two non-zero vectors (here it is the feature vectors) of an inner product space. Upon computing the similarity value, the content annotating system 101 may compare the similarity value with a threshold similarity value to identify one or more ROIs for each of the plurality of augmented image datasets. In case if the similarity value is greater than the threshold similarity value, the set of features of the plurality of augmented image datasets are mapped to the set of features of the one or more pre-annotated datasets to identify the one or more ROIs. The one or more ROIs are identified using one or more techniques. The one or more techniques may include, but not limited to, Oriented FAST and Rotated BRIEF (ORB) technique, histogram of Oriented Gradient (HOG) technique, Binary Robust Invariant Scalable Key points (BRISK), Scale-invariant feature transform (SIFT) and so on. Upon extracting the set of features, the content annotating system 101 may generate annotated content for the plurality of augmented image datasets based on the identified one or more ROIs and the pre-annotated image datasets. Particularly, the content annotating system 101 may obtain a boundary box around the object based on the identified one or more ROIs of the plurality of augmented image datasets. Upon obtaining the boundary box, the content annotating system 101 may dynamically annotate the object using the one or more pre-annotated datasets. Further, the content annotating system 101 utilizes the annotated content for the plurality of augmented image datasets along with the one or more pre-annotated datasets for training the model 104. The model 104 is trained to detect the one or more objects using machine learning techniques such as Deep Neural Networks (DNN), Convolutional Neural Network (CNN), Region based CNN (R-CNN) and so on. In an embodiment, the model 104 may be ported into Head-Mounted Device (TIMID) for assisting the user to repair and maintain the object.

In case of identifying the presence of the one or more ROIs along with associated one or more labels on the one or more similar images with respect to the plurality of images using the model 104, the content annotating system 101 predicts one or more ROIs along with associated one or more labels for the plurality of images based on the identified one or more ROIs along with the associated one or more labels. Upon predicting the one or more ROIs for the plurality of images, the content annotating system 101 detects one or more objects associated with the AR-VR applications based on the predicted one or more ROIs along with the one or more labels. Further, upon detecting the one or more objects, the content annotating system 101 provides one or more instructions corresponding to the detected one or more objects to the user for maintenance/repair of the one or more objects.

Figure 2:
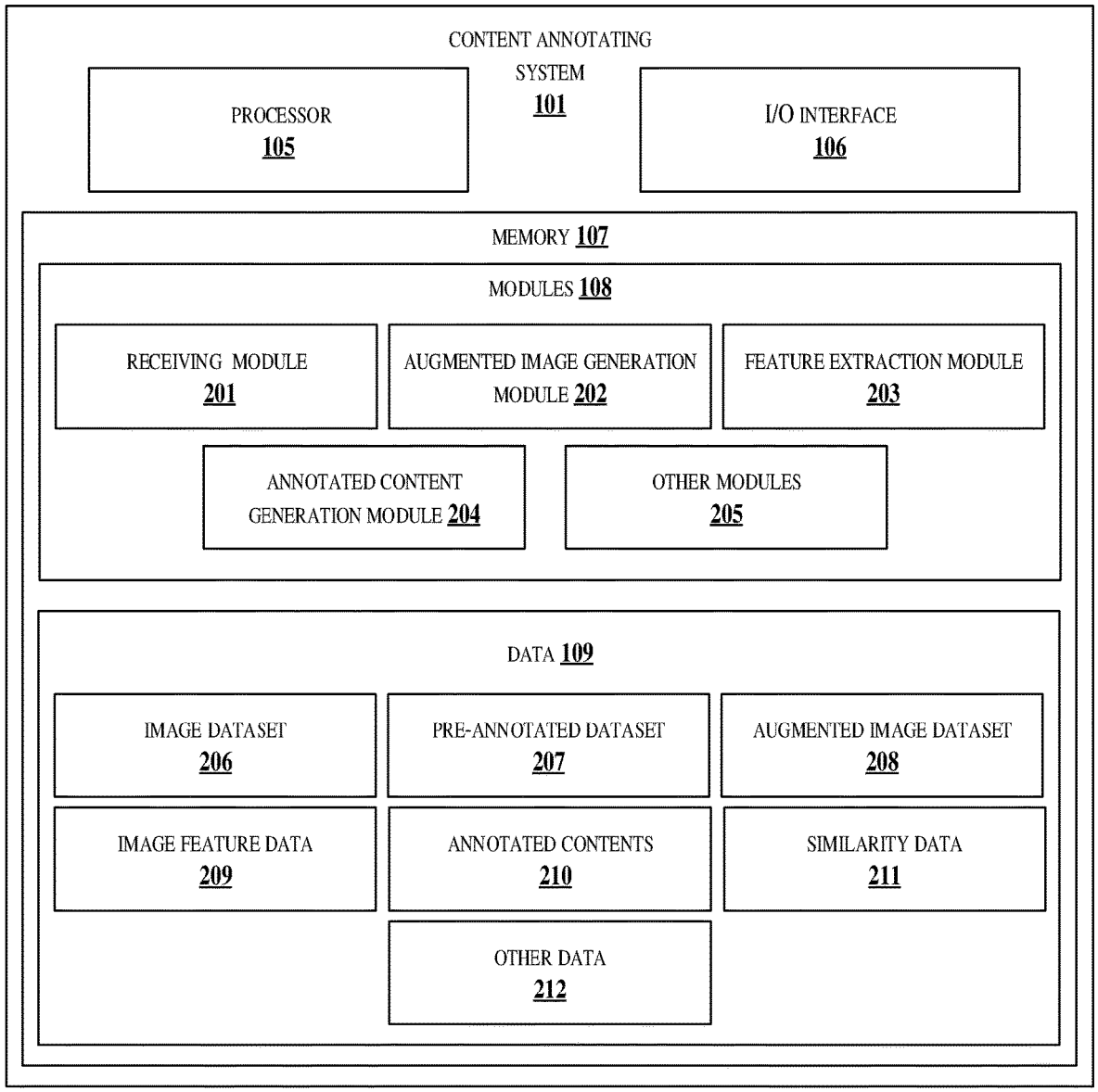
FIG. 2 shows a detailed block diagram of a content annotating system for dynamically generating annotated content for training a model for Augmented and Virtual Reality (AR-VR) applications, in accordance with some embodiments of the present disclosure.

FIG. 2 shows a detailed block diagram of a content annotating system for dynamically generating annotated content for training a model for Augmented and Virtual Reality (AR-VR) applications, in accordance with some embodiments of the present disclosure.

Data 109 and one or more modules 108 in the memory 107 of the content annotating system 101 is described herein in detail.

In one implementation, one or more modules 108 may include, but are not limited to, a receiving module 201, an augmented image generation module 202, a feature extraction module 203, an annotated content generation module 204, and other modules 205, associated with the content annotating system 101.

In an embodiment, data 109 in the memory 107 may include image dataset 206, pre-annotated dataset 207, augmented image dataset 208, image feature data 209 annotated contents 210, similarity data 211, and other data 212 associated with the content annotating system 101.

In an embodiment, the data 109 in the memory 107 may be processed by the one or more modules 108 of the content annotating system 101. The one or more modules 108 may be configured to perform the steps of the present disclosure using the data 109, for dynamically generating annotated content for training the model 104 for AR-VR applications. In an embodiment, each of the one or more modules 108 may be a hardware unit which may be outside the memory 107 and coupled with the content annotating system 101. In an embodiment, the one or more modules 108 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

One or more modules 108 of the content annotating system 101 function to dynamically generate the annotated content for training the model 104 for AR-VR applications. The one or more modules 108 along with the data 109, may be implemented in any system, for dynamically generating annotated content for training the model 104 for AR-VR applications.

The image dataset 206 may include plurality of images of one or more objects associated with the AR-VR applications. The plurality of images from the image dataset 206 may be used for generating annotated content for training the model 104 to detect one or more objects. For example, the image dataset may include images of the object such as, images of a printer, grinder, fan and so on.

The pre-annotated datasets 207 may include one or more images from the image dataset 206 which are manually annotated by the user.

The augmented image dataset 208 may include one or more images of the image dataset 206 which are augmented using the predefined augmented parameters. The predefined augmented parameters comprise at least one of, one or more size rotation, zoom, flip and distortion associated with each of the image dataset 206, and the like.

The image feature data 209 may include vectors form of different image features such as, textual features, colour features, edge features and the like. The different image features are extracted from the pre-annotated dataset 207 and the augmented image dataset 208.

The annotated contents 210 may include information related to one or more ROIs along with one or more labels on the augmented image dataset 208 which may be used for training the model 104 associated with the AR-VR applications.

The similarity data 211 may include similarity value which are cosine values computed between the set of features of the pre-annotated dataset 207 and the augmented image dataset 208. The similarity data 211 is compared with a threshold similarity value which may be cosine similarity value predefined by the user.

The other data 212 may store data, including temporary data and temporary files, generated by modules for performing the various functions of the content annotating system 101.

The receiving module 201 may receive the plurality of images for an object associated with the AR-VR applications. The object may be a printer, grinder, car and so on which is to be detected using the AR-VR applications. The user uses an AR-VR headset to detect the object and ROIs of the object. The AR-VR headset comprises the image capturing unit 103 and captures the plurality of images of the object. In case the image capturing unit 103 captures videos of the object, the videos of the object may be segmented into individual sequential frames/images to obtain the plurality of images. The images may be sequenced as $I=(I_1, I_2, I_3, I_4 \ldots, I_n)$, where $I_i$ may be sequences of images for each $i=1, 2 \ldots, n$. Upon receiving the plurality of images of the object, the one or more module 205 such as, an ROI identification module may identify either presence or absence of one or more ROIs along with associated one or more labels on one or more similar images with respect to the plurality of images using the model 104. Upon identifying the absence of the one or more ROIs on the one or more similar images, the receiving module 201 may obtain one or more pre-annotated datasets related to one or more images of the plurality of images from the user. For example, one or more images from the plurality of images of the object may be manually annotated by the user. The one or more images may be of different angles covering different parts of the object. The user may select ROIs on the one or more images and manually annotate the one or more images. The one or more pre-annotated images may be represented as $(RI_1, RI_2, \ldots, RI_n)$. Each of the one or more pre-annotated image datasets may include different annotated parts of the object. Upon obtaining the one or more pre-annotated datasets, the augmented image generation module 202 may generate a plurality of augmented image datasets for the plurality of images using predefined set of augmented parameters. For example, upon receiving the plurality of images of the object, the augmented image generation module 202 may generate the plurality of augmented images using different augmented features such as, one or more size rotation, zoom, flip and distortion associated with each of the plurality of images. For example, the plurality of augmented images may include, but is not limited to, zoomed image of the object, flipped image of the object, different size image of the object, distorted image of the object and the like. The plurality of augmented images may be represented as $(Aug_1, Aug_2, \ldots, Aug_n)$.

Upon generating plurality of augmented image datasets, the feature extraction module 203 may extract a set of features from the one or more pre-annotated datasets and the plurality of augmented image datasets. Initially, the feature extraction module 203 may select one or more ROIs along with one or more labels from the pre-annotated datasets. Upon selecting, the feature extraction module 203 extracts the set of features from the one or more ROIs. The set of features include vectors form of different features such as, textual features, colour features, edge features and the like. The feature extraction module 203 utilizes the set of features of the one or more ROIs to locate similar set of features on the plurality of augmented image datasets. The selected one or more ROIs along with the one or more labels for each of the one or more pre-annotated images may be represented as $RI_1=(CRI_{11}, CRI_{12}, \ldots, CRI_{1n_1}, RI_2=(CRI_{21}, CRI_{22}, \ldots, CRI_{2n_2}) \ldots RI_n=(CRI_{n1}, CRI_{12}, \ldots, CRI_{nn_n})$. The CRI's represents the selected one or more ROIs. Further, the feature extraction module 203 may compute a similarity value between the set of features of the one or more pre-annotated datasets and the set of features of the plurality of augmented image datasets. Upon computing the similarity value, the feature extraction module 203 compares the similarity value with the threshold similarity value to identify one or more ROIs for each of the plurality of augmented image datasets.

Upon comparing the similarity value, if the similarity value is greater than the threshold similarity value, the feature extraction module 203 maps the set of features of the plurality of augmented image datasets to the set of features of the one or more pre-annotated datasets. The set of features of the selected one or more ROIs may be represented as $FeReL_1=(f_{11}, f_{12}, \ldots f_{1n}), FeReL_2=(f_{22}, f_{22}, \ldots, f_{2n}), \ldots, FeReL_n=(f_{n1}, f_{12}, \ldots f_{nn})$ The $f_{11}, f_{12}, \ldots f_{1n}; f_{21}, f_{22}, \ldots f_{2n}, \ldots f_{11}, f_{12}, \ldots f_{1n}$ represents the set of features associated with each of the selected one or more ROIs. Further, the set of features of the pre-annotated datasets which matches with the set of features of the plurality of augmented image datasets helps to identify the one or more ROIs on the augmented image datasets. The one or more ROIs are identified using the ORB technique, HOG technique, BRISK technique and so on. Upon identifying the one or more ROIs, the annotated content generation module 204 may generate annotated content for the plurality of augmented image datasets based on the comparison. Particularly, the annotated content generation module 204 obtains a boundary box around the object based on the identified one or more ROIs of the plurality of augmented image datasets. Upon obtaining the boundary box, the annotated content generation module 204 annotates the boundary box representing the object.

Further, the annotated content generated for the plurality of augmented image datasets along with the one or more pre-annotated datasets are used by the one or more module 205 which includes a training module for training the model 104 associated with the AR-VR applications for detecting the object. In an embodiment, the model 104 is used in run-time for detecting the object on the plurality of images. The model 104 is incrementally updated by the training module when new content is identified on the plurality of images. The new content may include, but is not limited to, a new device identified on the plurality of image, a new machine part added to the device and so on. For example, a laptop includes labels of mouse, keyboard, and battery. The dynamic annotations of the variables such as, the mouse, keyboard and battery are initially created, and the training module utilizes the dynamic annotation and trains the model 104. Further, when a new data is added to the laptop such as, Random-Access Memory (RAM), annotations of RAM is dynamically generated along with the existing annotations of the mouse, keyboard, and battery and the model 104 is trained. Thereafter, the model 104 is ported into the AR-VR device 102 so that the user can detect the object in real time for machine repair or maintenance. In an embodiment, the model 104 is converted into Tensor Flow (TF) TFLite file with Tensor Flow lite. The converted file is ported into HMD devices for detecting the objects or object parts. The HMD devices may provide the augmented information on each of the object part, which helps the user to continue repair and maintenance work of the object.

In an embodiment, upon identifying the presences of the one or more ROIs along with associated one or more labels on one or more similar images with respect to the plurality of images using the model 104, the one or more modules 205 such as, an ROI prediction module to predict one or more ROIs along with one or more labels on the plurality of images using the ORB technique. Upon predicting the one or more ROIs on the plurality of images, the one or more modules 205 such as, an object detection module may detect one or more objects associated with the AR-R applications based on the predicted one or more ROIs along with one or more labels. Upon detecting the one or more objects, the one or more modules 205 such as an instruction providing module provides one or more instructions to the user to repair/maintain the detected one or more objects.

The one or more modules 108 may also include other modules 205 such as the ROI identification module, the ROI prediction module, the training module, object detection module and the instruction providing module to perform various miscellaneous functionalities of the content annotating system 101. It will be appreciated that such modules may be represented as a single module or a combination of different modules.

Figure 3:
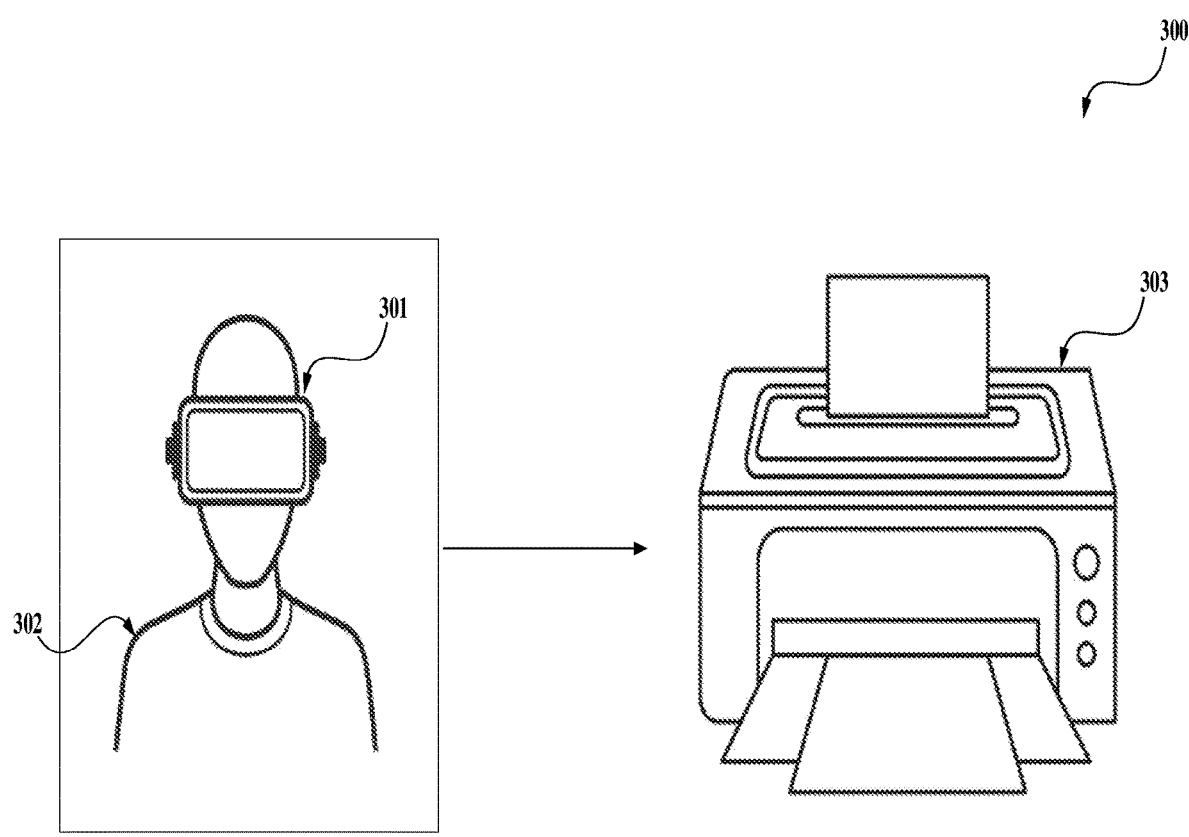
FIG. 3 shows exemplary embodiments for dynamically generating annotated content for a plurality of images of a printer to train a model for detecting one or more parts of the printer using AR-VR applications, in accordance with some embodiments of present disclosure.

FIG. 3 shows exemplary embodiments for dynamically generating annotated content for a plurality of images of a printer to train a model for detecting one or more parts of the printer using AR-VR applications, in accordance with some embodiments of present disclosure. FIG. 3 shows an environment 300 which includes an AR-VR headset 301, a user 302 and an object 303 (hereafter referred as printer). The user 302 is wearing the AR-VR headset 301 to detect the printer 303 and repair/maintain the printer 303. The AR-VR headset 301 is integrated with a camera which captures plurality of images of the printer 303. In the current context, the content annotating system 101 receives the plurality of images of the printer 303. The content annotating system 101 identifies either presence or absence of one or more ROIs along with one or more labels on one or more similar images with respect to the plurality of images of the printer 303 using the model 104. Upon identifying absence of the one or more ROIs on the one or more similar images, the content annotating system 101 obtains the one or more pre-annotated image datasets of the plurality of images. For example, in the current scenario, the user 302 utilises one or more images of the printer 303 from the plurality of images of the printer 303 to manually annotate. The user 302 may manually annotate one or more ROIs of the printer 303 such as, paper support, printer cover, sheet feeder, output tray and so on. Further, upon receiving the one or more pre-annotated image datasets, the content annotating system 101 generates the plurality of augmented image datasets for the plurality of images of the printer 303 using the predefined set of augmented parameters. The content annotating system 101 generates multiple images of the printer 303 in one or more size, zoom images of the printer 303, flipped images of the printer 303 and distorted images of the printer 303. Upon generating the augmented image datasets, the content annotating system 101 extracts the set of features from the pre-annotated datasets and the plurality of augmented image datasets. The set of features indicates vector component comprising textual features, colour features and the edge features. The content annotating system 101 computes the similarity value between the set of features of the pre-annotated datasets manually annotated by the user 302 and the set of features of the plurality of augmented image datasets. Upon computing the similarity value, the content annotating system 101 compares the similarity value with the threshold similarity value. Upon comparing, the set of features of the plurality of augmented image datasets is mapped to the set of features of the pre-annotated datasets to identify the one or more ROIs on the plurality of augmented image datasets if similarity value is greater than threshold similarity value. For example, in this scenario, the identified one or more ROIs on the plurality of augmented image datasets of the printer 303 may include, but is not limited to, paper support, printer cover, sheet feeder, output tray. Upon identifying the one or more ROIs, the content annotating system 101 generates the annotated content for the plurality of augmented images. The annotated content for the plurality of augmented image datasets of the printer 303 along with the pre-annotated datasets of the printer 303 are used for training the model 104 associated with the AR-VR applications.

In an embodiment, upon identifying the presence of the one or more ROIs on the one or more similar images of the printer 303, the content annotating system 101 predicts one or more ROIs along with one or more labels on the plurality of images of the printer 303 using the identified one or more ROIs. The identified one or more ROIs may include, but is not limited to, paper support, printer cover, sheet feeder, output tray and so on. Further, upon predicting, the content annotating system 101 detects the printer 303 based on the predicted one or more ROIs. Upon detecting the printer 303, the content annotating system 101 provides one or more instructions to the user 302 to repair/maintain the printer 303. For example, the printer 303 may be jammed due to papers and the one or more instructions related to clearing the jam of the printer 303 is provided to the user 302 to maintain the printer 303.

Figure 4:
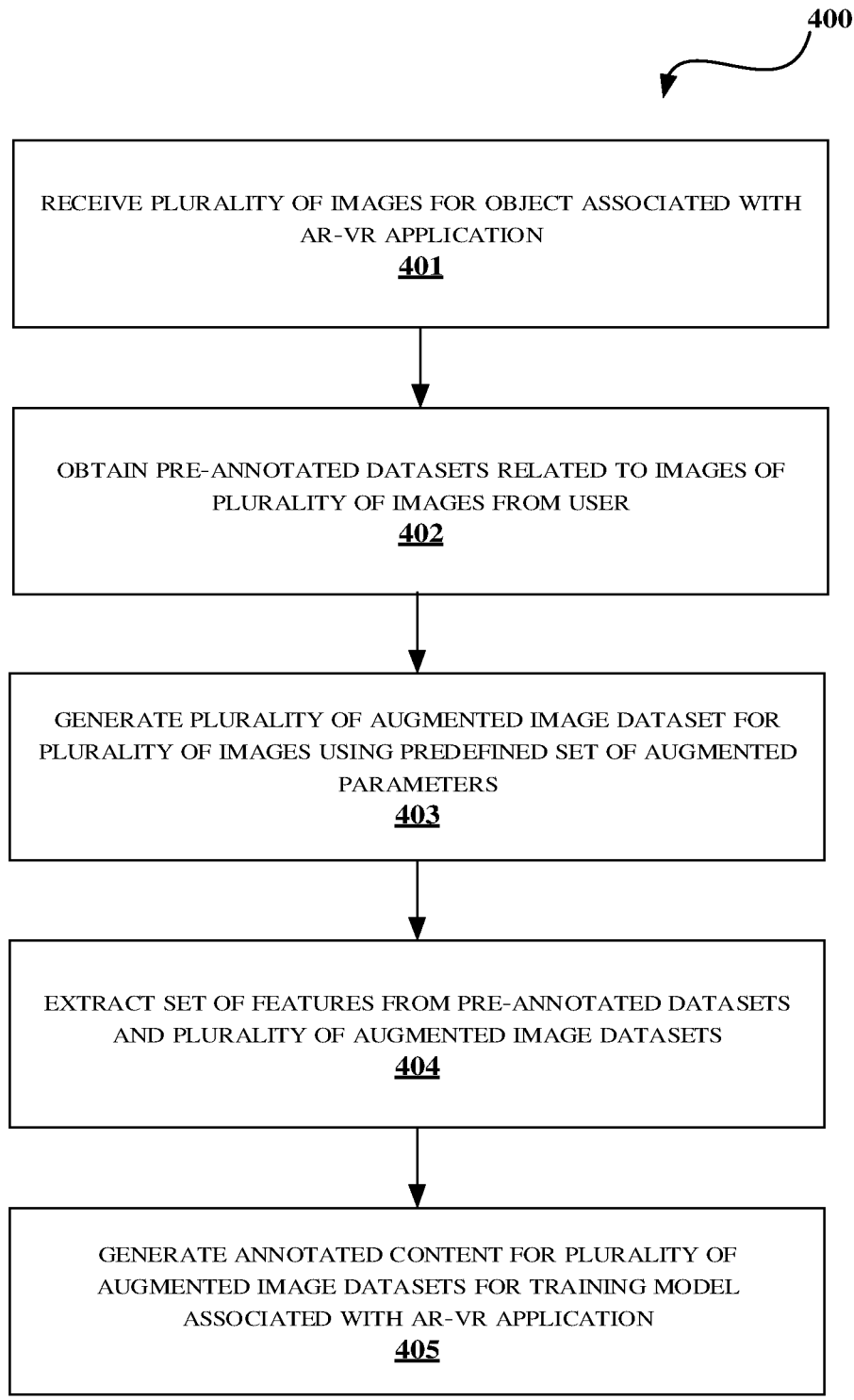
FIG. 4 illustrates a flow diagram showing exemplary method for dynamically generating annotated content for training a model for Augmented and Virtual Reality (AR-VR) applications, in accordance with some embodiments of present disclosure.

FIG. 4 illustrates a flow diagram showing exemplary method for dynamically generating annotated content for training a model for Augmented and Virtual Reality (AR-VR) applications, in accordance with some embodiments of present disclosure.

As illustrated in FIG. 4, the method 400 may include one or more blocks for executing processes in the content annotating system 101. The method 400 may be described in the general context of computer executable instructions. Generally, computer executable instructions can include routines, programs, objects, components, data structures, procedures, modules, and functions, which perform particular functions or implement particular abstract data types.

The order in which the method 400 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, receiving, by the receiving module 201, the plurality of images for an object associated with AR-VR applications. The object may be a device or a device part which is to be detected by using the AR-VR applications.

At block 402, obtaining, by the receiving module 201, one or more pre-annotated datasets related to one or more images of the plurality of images. The one or more images are manually annotated by a user.

At block 403, generating, by the augmented image generation module 202, the plurality of augmented image datasets for the plurality of images using the predefined set of augmented parameters. The predefined set of augmented parameters comprise one or more size rotation, zoom, flip and distortion associated with each of the plurality of images.

At block 404, extracting, by the feature extraction module 203, the set of features from the one or more pre-annotated datasets and the plurality of augmented image datasets. Particularly, one or more ROIs from each of the one or more pre-annotated datasets are selected by the feature extraction module 203. Upon selecting, the set of features from the one or more ROIs associated with each of the one or more pre-annotated datasets and the set of features for the plurality of augmented image datasets are extracted by the feature extraction module 203. Upon extracting, the similarity value between the set of features of the one or more pre-annotated datasets and the set of features of the plurality of augmented image datasets is computed. Upon computing, the similarity value is compared with the threshold similarity value to identify one or more ROIs for each of the plurality of augmented image datasets and mapping the set of features of the plurality of augmented image datasets to the set of features of the one or more pre-annotated datasets to identify the one or more ROIs.

At block 405, generating, by the annotated content generation module 204, annotated content for the plurality of augmented image datasets based on the comparison. The annotated content for the plurality of augmented image datasets along with the one or more pre-annotated datasets are used for training the model associated with the AR-VR applications.

Particularly, a boundary box around the object based on one or more ROIs of the plurality of augmented image datasets is obtained. Upon obtaining the boundary box, the object is annotated based on the obtained boundary box using the one or more pre-annotated datasets.

Computing System

Figure 5:
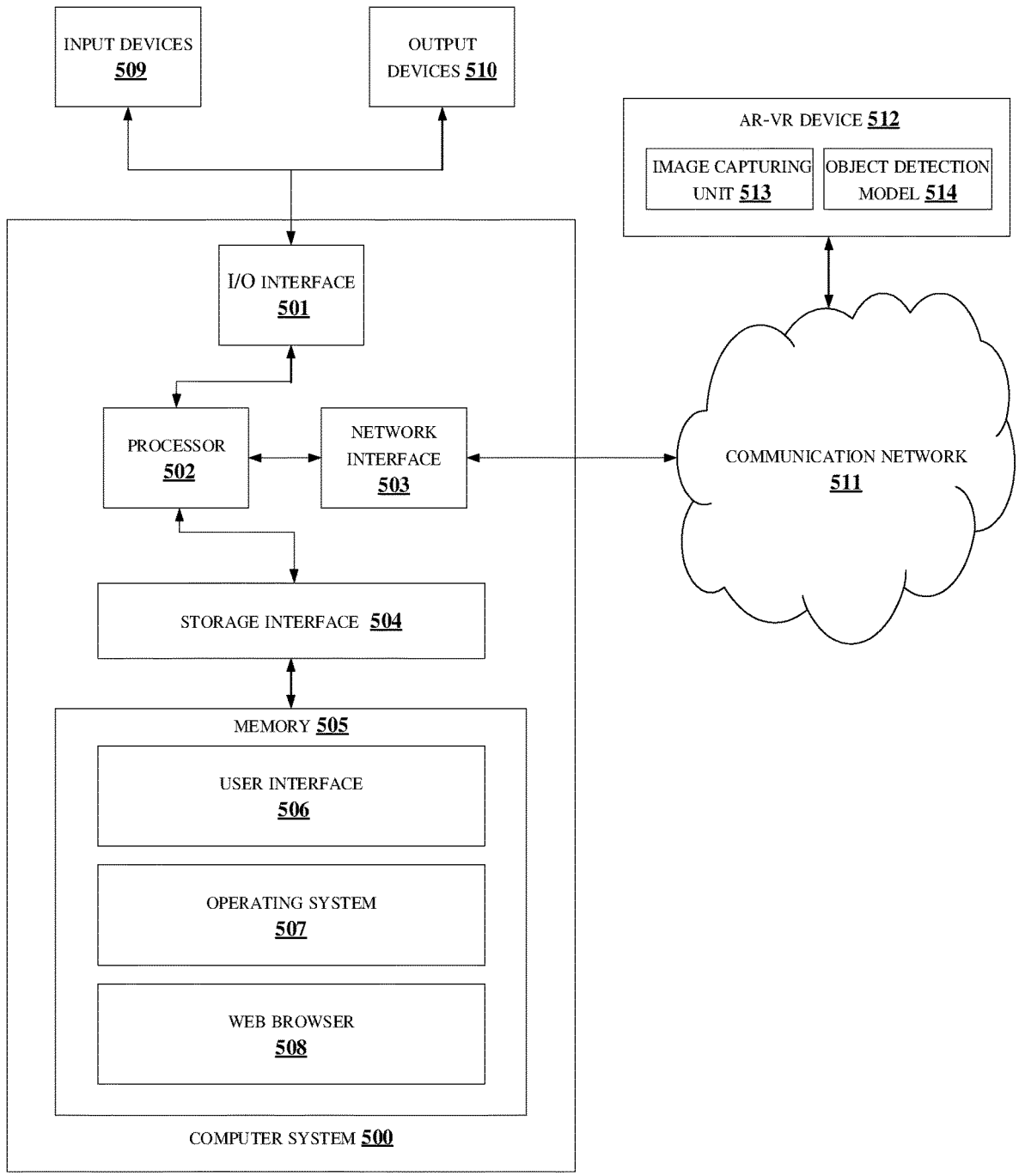
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the content annotating system 101. The computer system 500 may include a central processing unit ("CPU" or "processor") 502. The processor 502 may include at least one data processor for executing processes in Virtual Storage Area Network. The processor 502 may include specialized processing units such as, integrated system (bus) controllers, memory management control units, floating point units, graphics processing units, digital signal processing units, etc.

The processor 502 may be disposed in communication with one or more input/output (I/O) devices 509 and 510 via I/O interface 501. The I/O interface 501 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices 509 and 510. For example, the input devices 509 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 510 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 may consist of the content annotating system 101. The processor 502 may be disposed in communication with the communication network 511 via a network interface 503. The network interface 503 may communicate with the communication network 511. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 511 may include, without limitation, a direct interconnection, local area network (LAN), wide area network (WAN), wireless network (e.g., using Wireless Application Protocol), the Internet, etc. Using the network interface 503 and the communication network 511, the computer system 500 may communicate with image capturing unit 513 of the AR-VR device 512 and the object detection model 514 (also referred as model 514) for dynamically generating the annotated content for training the object detection model 514 for AR-VR applications. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 511 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (Xp™, VISTA™/7/8, 10 etc.), APPLE® IOS™, GOOGLE® ANDROID™, BLACKBERRY® OS, or the like.

In some embodiments, the computer system 500 may implement a web browser 508 stored program component. The web browser 508 may be a hypertext viewing application, such as Microsoft Internet Explorer, Google Chrome, Mozilla Firefox, Apple Safari, etc. Secure web browsing may be provided using Hypertext Transport Protocol Secure (HTTPS), Secure Sockets Layer (SSL), Transport Layer Security (TLS), etc. Web browser 508 may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C #, Microsoft NET, Common Gateway Interface (CGI) scripts, Java, JavaScript, PERL, PUP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provisions a method for dynamically generating annotated content for training a model for AR-VR applications without the need for manually generating annotated content by user. The trained model detects devices or devices parts more accurately and effectively.

An embodiment of the present disclosure reduces time required for annotating ROIs of the devices and the device parts as it dynamically generates annotated content for training the model.

An embodiment of the present disclosure is helpful when user needs to identify the device and device parts to perform repair and maintenance activities.

An embodiment of the present disclosure reduces computation resources for training dataset preparation and model training by dynamically generating annotated content for training the model.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 shows certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Content annotating system |
| 102 | AR-VR device |
| 103 | Image capturing unit |
| 104 | Object detection model |
| 105 | Processor |
| 106 | I/O interface |
| 107 | Memory |
| 108 | Modules |
| 109 | Data |
| 201 | Receiving module |
| 202 | Augmented image generation module |
| 203 | Feature extraction module |
| 204 | Annotated content generation module |
| 205 | Other modules |
| 206 | Image dataset |
| 207 | Pre-annotated dataset |
| 208 | Augmented image dataset |
| 209 | Image feature data |
| 210 | Annotated content |
| 211 | Similarity data |
| 212 | Other data |
| 301 | AR-VR headset |
| 302 | User |
| 303 | Printer |
| 500 | Computer system |
| 501 | I/O Interface |
| 502 | Processor |
| 503 | Network interface |
| 504 | Storage interface |
| 505 | Memory |
| 506 | User interface |

-continued

| Reference Number | Description |
| --- | --- |
| 507 | Operating system |
| 508 | Web browser |
| 509 | Input devices |
| 510 | Output devices |
| 511 | Communication network |
| 512 | AR-VR device |
| 513 | Image capturing unit |
| 514 | Object detection model |

What is claimed is:

1. A method of dynamically generating annotated content for training a model for Augmented and Virtual Reality (AR-VR) applications, the method comprising:
receiving, by a processor of a content annotating system, a plurality of images for an object associated with AR-VR applications;
obtaining, by the processor of the content annotating system, one or more pre-annotated datasets related to one or more images of the plurality of images from a user;
generating, by the processor of the content annotating system, a plurality of augmented image datasets for the plurality of images using a predefined set of augmented parameters, wherein the predefined set of augmented parameters comprise distortion associated with each of the plurality of images;
extracting, by the processor of the content annotating system, a set of features from the one or more pre-annotated datasets and the plurality of augmented image datasets, wherein the extracted set of features indicate a vector component comprising textual features, color features, and edge features, wherein the extraction comprises:
selecting, by the processor of the content annotating system, one or more Region of Interests (ROIs) from each of the one or more pre-annotated datasets; and
extracting, by the processor of the content annotating system, the set of features from the one or more ROIs associated with each of the one or more pre-annotated datasets and the set of features for the plurality of augmented image datasets, wherein the extracted set of features of the one or more pre-annotated datasets is compared with the set of features of the plurality of augmented image datasets, wherein the comparison comprises:
computing, by the processor of the content annotating system, a similarity value between the set of features of the one or more pre-annotated datasets and the set of features of the plurality of augmented image datasets; and
comparing, by the processor of the content annotating system, the similarity value with a threshold similarity value to identify the one or more ROIs for each of the plurality of augmented image datasets; and
generating, by the processor of the content annotating system, annotated content for the plurality of augmented image datasets based on the comparison, wherein the annotated content for the plurality of augmented image datasets along with the one or more pre-annotated datasets are used for training the model associated with the AR-VR applications.

2. The method as claimed in claim 1, wherein the set of features of the plurality of augmented image datasets are mapped to the set of features of the one or more pre-annotated datasets to identify the one or more ROIs, if the similarity value is greater than the threshold similarity value.

3. The method as claimed in claim 1, wherein generating the annotated content for the plurality of augmented image datasets comprises:
obtaining, by the processor of the content annotating system, a boundary box around the object based on the one or more ROIs of the plurality of augmented image datasets; and
annotating, by the processor of the content annotating system, the object based on the obtained boundary box using the one or more pre-annotated datasets.

4. The method as claimed in claim 1, wherein the model associated with the AR-VR applications is trained using machine learning techniques.

5. The method as claimed in claim 1, wherein the predefined set of augmented parameters comprise one or more size rotation, zoom, and flip associated with each of the plurality of images.

6. The method as claimed in claim 1, wherein receiving the plurality of images, further comprises:
identifying, by the processor of the content annotating system, one of presence and absence of the one or more ROIs along with associated one or more labels on one or more similar images with respect to the plurality of images using the model;
predicting, by the processor of the content annotating system, the one or more ROIs along with the associated one or more labels for the plurality of images based on the identified one or more ROIs along with the associated one or more labels;
detecting, by the processor of the content annotating system, one or more objects associated with the AR-VR applications based on the predicted one or more ROIs along with the associated one or more labels; and
providing, by the processor of the content annotating system, one or more instructions corresponding to the detected one or more objects for one of maintenance and repair of the one or more objects.

7. The method as claimed in claim 6, wherein upon identifying absence of the one or more ROIs, receiving the plurality of images by the processor of the content annotating system for dynamically generating annotated content based on the predicted one or more ROIs along with the associated one or more labels.

8. A content annotating system for dynamically generating annotated content for training a model for Augmented and Virtual Reality (AR-VR) applications, comprising:
a processor; and
a memory communicatively coupled to the processor, wherein the memory stores processor-executable instructions, which, on execution, cause the processor to:
receive a plurality of images for an object associated with AR-VR applications;
obtain one or more pre-annotated datasets related to one or more images of the plurality of images from a user;
generate a plurality of augmented image datasets for the plurality of augmented images using a predefined set of augmented parameters, wherein the predefined set of augmented parameters comprises distortion associated with each of the plurality of images;

extract a set of features from the one or more pre-annotated datasets and the plurality of augmented image datasets, wherein the extracted set of features indicate a vector component comprising textual features, color features, and edge features, wherein the extraction comprises:
    selecting one or more Region of Interests (ROIs) from each of the one or more pre-annotated datasets; and
    extracting the set of features from the one or more ROIs associated with each of the one or more pre-annotated datasets and the set of features for the plurality of augmented image datasets, wherein the extracted set of features of the one or more pre-annotated datasets is compared with the set of features of the plurality of augmented image datasets, wherein the comparison comprises:
        computing a similarity value between the set of features of the one or more pre-annotated datasets and the set of features of the plurality of augmented image datasets; and
        comparing the similarity value with a threshold similarity value to identify the one or more ROIs for each of the plurality of augmented image datasets; and
    generate annotated content for the plurality of augmented image datasets based on the comparison, wherein the annotated content for the plurality of augmented image datasets along with the one or more pre-annotated datasets are used for training the model associated with the AR-VR applications.

9. The content annotating system as claimed in claim 8, wherein the processor maps the set of features of the plurality of augmented image datasets to the set of features of the one or more pre-annotated datasets to identify the one or more ROIs, if the similarity value is greater than the threshold similarity value.

10. The content annotating system as claimed in claim 8, wherein the processor generates the annotated content for the plurality of augmented image datasets by:
    obtaining a boundary box around the object based on the one or more ROIs of the plurality of augmented image datasets; and
    annotating the object based on the obtained boundary box using the one or more pre-annotated datasets.

11. The content annotating system as claimed in claim 8, wherein the predefined set of augmented parameters comprise one or more size, rotation, zoom, and flip associated with each of the plurality of images.

12. The content annotating system as claimed in claim 8, wherein upon receiving the plurality of images, the processor is configured to:
    identify one of presence and absence of the one or more ROIs along with associated one or more labels on one or more similar images with respect to the plurality of images using the model;
    predict the one or more ROIs along with the associated one or more labels for the plurality of images based on the identified one or more ROIs along with the associated one or more labels;
    detect one or more objects associated with the AR-VR applications based on the predicted one or more ROIs along with the associated one or more labels; and
    provide one or more instructions corresponding to the detected one or more objects for one of maintenance and repair of the one or more objects.

13. The content annotating system as claimed in claim 12, wherein upon identifying absence of the one or more ROIs, the processor receives the plurality of images for dynamically generating annotated content based on the predicted one or more ROIs along with the associated one or more labels.

14. A non-transitory computer readable medium including instruction stored thereon that when processed by at least one processor cause a content annotating system to perform operation comprising:
    receiving a plurality of images for an object associated with AR-VR applications;
    obtaining one or more pre-annotated datasets related to one or more images of the plurality of images from a user;
    generating a plurality of augmented image datasets for the plurality of images using a predefined set of augmented parameters, wherein the predefined set of augmented parameters comprises distortion associated with each of the plurality of images;
    extracting a set of features from the one or more pre-annotated datasets and the plurality of augmented image datasets, wherein the extracted set of features indicate a vector component comprising textual features, color features, and edge features, wherein the extraction comprises:
        selecting, by the processor of the content annotating system, one or more Region of Interests (ROIs) from each of the one or more pre-annotated datasets; and
        extracting, by the processor of the content annotating system, the set of features from the one or more ROIs associated with each of the one or more pre-annotated datasets and the set of features for the plurality of augmented image datasets, wherein the extracted set of features of the one or more pre-annotated datasets is compared with the set of features of the plurality of augmented image datasets, wherein the comparison comprises:
            computing, by the processor of the content annotating system, a similarity value between the set of features of the one or more pre-annotated datasets and the set of features of the plurality of augmented image datasets; and
            comparing, by the processor of the content annotating system, the similarity value with a threshold similarity value to identify the one or more ROIs for each of the plurality of augmented image datasets; and
    generating annotated content for the plurality of augmented image datasets based on the comparison, wherein the annotated content for the plurality of augmented image datasets along with the one or more pre-annotated datasets are used for training the model associated with the AR-VR applications.

* * * * *